May 12, 1970 A. FISCHER 3,510,979
ASSEMBLY KIT
Filed Feb. 25, 1966 3 Sheets-Sheet 1
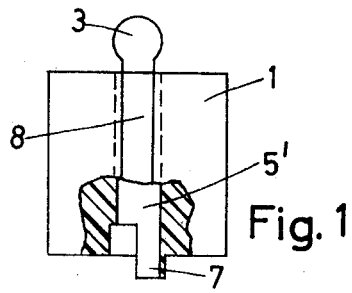
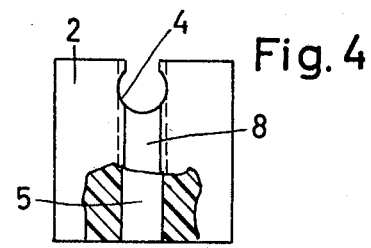
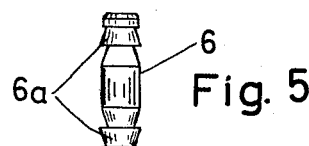
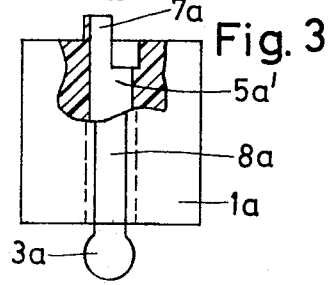
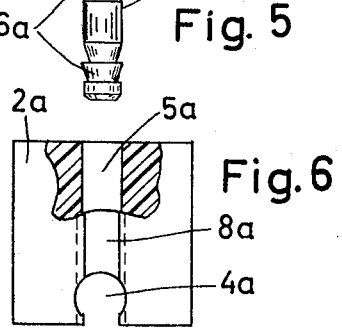
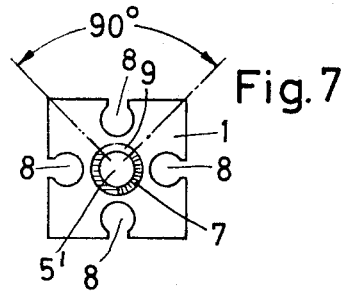
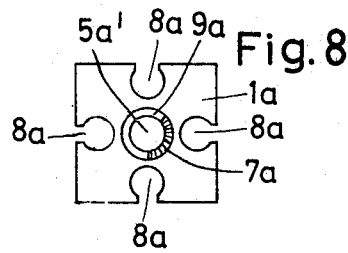
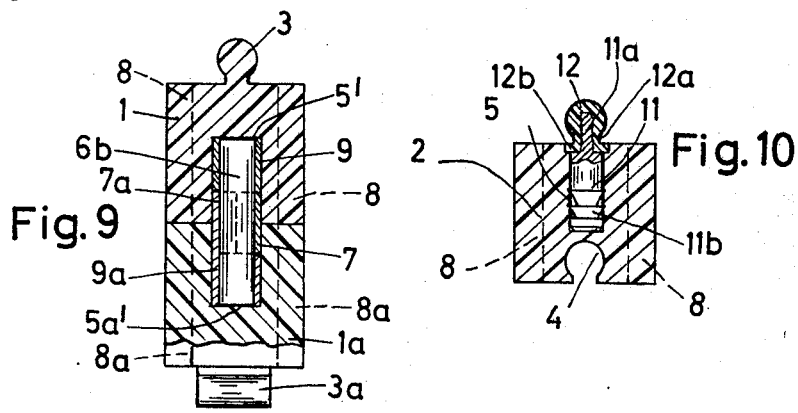
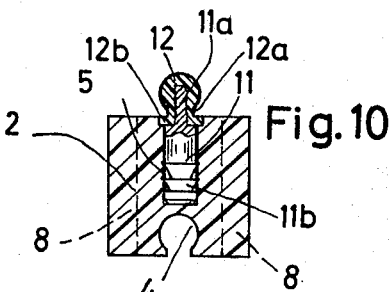
INVENTOR.
ARTUR FISCHER
BY
Michael J. Striker
Attorney May 12, 1970  A. FISCHER  3,510,979
ASSEMBLY KIT Filed Feb. 25, 1966  3 Sheets-Sheet 2

INVENTOR.
ARTUR FISCHER
BY

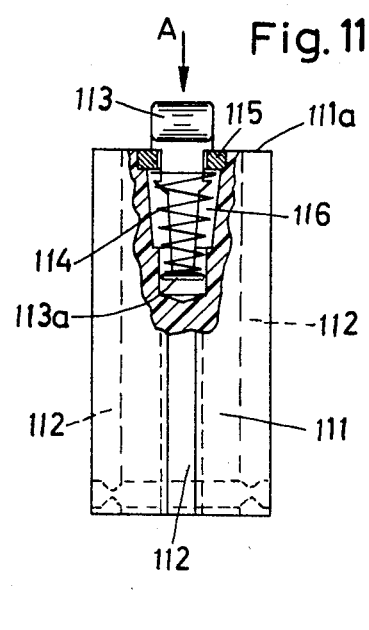
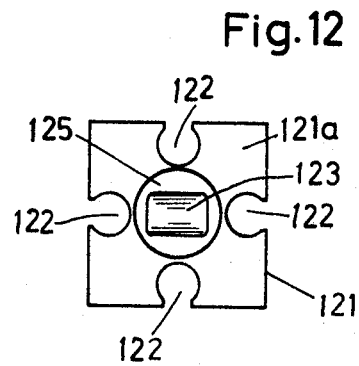
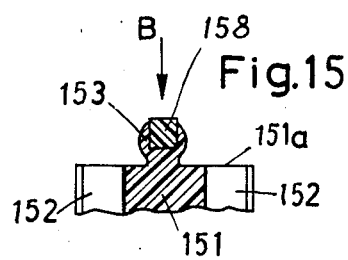
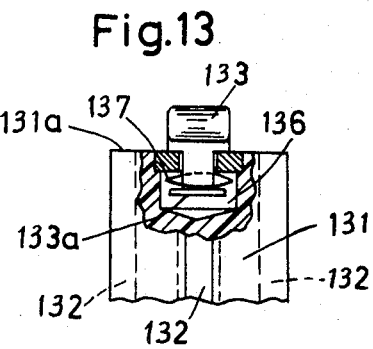
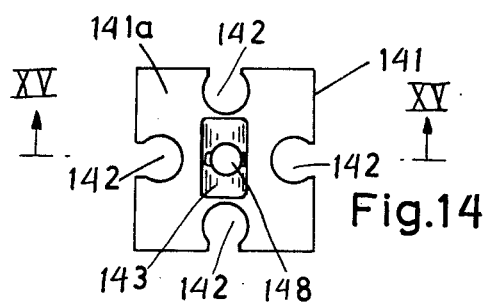

United States Patent Office 3,510,979
Patented May 12, 1970

3,510,979
ASSEMBLY KIT
Artur Fischer, Tumlingen, Kreis Freudenstadt, Germany
Filed Feb. 25, 1966, Ser. No. 530,063
Claims priority, application Germany, Mar. 2, 1965,
F 45,401; Apr. 9, 1965, F 45,785; Dec. 25, 1965,
F 47,765
Int. Cl. A63h 33/04
U.S. Cl. 46—25                                    19 Claims

ABSTRACT OF THE DISCLOSURE

An assembly kit comprises two similar building blocks each having an open-ended passage. An elongated connecting member is provided whose end portions are receivable in these passages in tight frictional engagement to couple the blocks together and define an axis of rotation for them so that they may be angularly displaced with reference to one another.

---

The present invention relates to an assembly kit. More specifically, the invention relates to an assembly kit of the type in which structural elements, such as blocks, are secured to one another to assemble structures such as buildings and the like. Still more specifically, the present invention relates to an assembly kit of the type outlined above which is suitable as a toy and in which the blocks are joined to one another by the use of connecting means.

Assembly kits of this general type are disclosed in my copending application Ser. No. 492,646, filed on Oct. 4, 1965 and entitled "Assembly Kit."

Joining of the blocks in the assembly kits in my aforesaid application is accomplished by providing one or more surfaces of the blocks with grooves which widen inwardly away from the respective surface. The blocks also have one or more cylindrical heads whose axes extend parallel to the respective surfaces to which they are each secured by necks having smaller cross-sections than the cross-sections of the heads. When two blocks are assembled, a neck on one is received in the narrow part of the groove of another block, whereas the head carried by the respective neck is received in the widened inner part of the groove. Assembly kits of this type are of considerable utility and perform their intended purpose well. However, they unfortunately do not permit an angular displacement of one block relative to the other when the blocks are joined, except as may be dictated by the positioning of the grooves and heads. Of course, since such positioning is fixed in all cases, no later relative movement of the blocks is possible.

The versatility of assembly kits of the type outlined above can be greatly enhanced if it is made possible to enable relative movement of blocks which are connected to one another.

It is therefore a general object of the present invention to provide an assembly kit of structural elements, such as blocks, which is still more versatile than those of my above-mentioned application.

A more specific object of the present invention is to provide an assembly kit of this type in which any two blocks constructed in accordance with the novel invention can be angularly moved with respect to one another about an axis which is common to the blocks.

Yet a more specific object of the present invention is to provide assembly kit of this type with a connecting means which will assure reliable connection of the blocks to one another while at the same time enabling angular movement of the blocks about the above-mentioned common axis without, however, permitting undesired relative angular movement of the blocks.

In accordance with the above objects and with one feature of the invention I provide an assembly kit which comprises the combination of two similar blocks each having an open-ended passage, and an elongated connecting member having end portions which are receivable in the passages in frictional engagement with the surrounding material. Thereby, the connecting member couples the blocks together and defines at the same time an axis about which the blocks may be angularly displaced with reference to one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIGS. 1–3 constitute an exploded view of a coupling in accordance with the present invention, FIG. 1 showing one block, FIG. 3 showing another complementary block, and FIG. 2 showing a connecting means for joining the two blocks together;

FIGS. 4–6 are views which correspond substantially to those of FIGS. 1–3, incorporating minor variations in the construction of the blocks;

FIGS. 7 and 8 show end views of blocks in accordance with the present invention, incorporating means for preventing undesired rotation of such blocks with respect to other blocks which are connected thereto;

FIG. 9 is a longitudinal section through the blocks of FIGS. 7 and 8, showing the same in the connected condition thereof;

FIG. 10 is a sectional view of a block in accordance with the present invention and incorporating a modified connecting means;

FIG. 10b is a top plan view of the lowermost of the two blocks shown in FIG. 10a;

FIG. 11 is a partially sectioned view of a block incorporating a further modified connecting means;

FIG. 12 is a top plan view of the embodiment shown in FIG. 1, as seen in direction of the arrow A;

FIG. 13 is a partially sectioned fragmentary elevation of a block incorporating a further modified connecting means;

FIG. 14 is a top plan view of a block provided with yet an additional modified connecting means; and FIG. 15 is a partly sectioned fragmentary side elevation of the embodiment of FIG. 14, taken on the line V—V thereof.

Figure 10A:
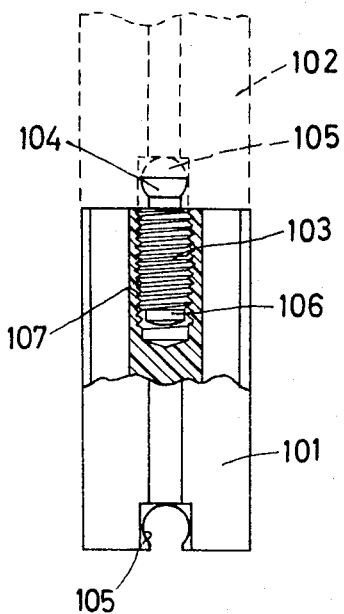
FIG. 10a is a partially sectioned view of two connected blocks, incorporating a further modified connecting means.

Discussing now the drawing in detail, and firstly FIGS. 1–3 thereof, it will be seen that there are shown two blocks 1, 1a which are respectively provided on one end face thereof with cylindrical connecting heads 3, 3a each having an axis extending parallel to the respective end face. These blocks, as well as those which are to be described hereafter, may be made from a plastic material, preferably from a polyamide which has been found to be advantageous since it is very resistant to wear and abuse. The end faces opposite the ones carrying the respective heads 3, 3a are each provided with an open circular passage 5, 5' which extends into the respective block. Preferably, these passages are centrally located. A connecting means, such as an elongated connecting member 6, is partly receivable in each of the passages 5, 5' of the blocks 1, 1a. It is preferred to construct the connecting member 6 from a metallic material and to provide it with ridges which, in profile view, are of sawtoothed outline. Such ridges are indicated with reference numeral 6a and it will be seen that they are in fact flanges extending radially outwardly from the connecting member 6 and at the same time diverging conically in the direction from one end portion towards the other. It will be seen that insertion of the end portions thus provided with these ridges 6a into the respective passages 5, 5' is relatively easy, whereas withdrawal is more difficult since the outer edges of the ridges 6a frictionally engage the surrounding material and resist any but purposeful withdrawal stresses.

The end faces at which the passages 5, 5' are open are, in accordance with a further feature of the invention, preferably each provided with an axially projecting portion 7, 7a in the form of a segment of a circle, such portion partly surrounding the periphery of the passage. If these portions are eliminated, an embodiment which is also intended to be encompassed herein, then the blocks 1, 1a may be rotated without any hindrance and to any desired degree about an axis defined by the elongation of connecting member 6. If, however, these portions 7, 7a are provided, then the rotation of the blocks 1, 1a is limited to that portion of arc which is not covered by the combined segments. As shown in FIG. 7, this may for example be 90°. The projections 7, 7a may consist of the same material as the blocks 1, 1a and, if so, may be integrally formed with these blocks.

The embodiment shown in FIGS. 3–6 is substantially the same as in FIGS. 1–3 except that the blocks which here are designated with reference numerals 2, 2a, are on one end face each provided with an inwardly diverging groove 4, 4a whose diverging portion has a cross-sectional area corresponding to the connecting heads 3, 3a of the blocks in FIGS. 1–3, and in which these heads may be received for establishing further connections between such blocks or other similar ones if the use of connecting member 6 is not desired. The passages are indicated with reference numerals 5a, 5a' and the connection is again accomplished by means of a connecting member 6 provided with ridges 6a. Furthermore, the end faces of the blocks are advantageously provided with longitudinal extending grooves 8, 8a of the same configuration as the grooves 4, 4a.

As shown in FIGS. 7–9 the projecting portions 7' and 7a' may also consist of metal and may be manufactured separately, to be introduced into the passages 5', 5a' after manufacture of the respective blocks 1, 1a or 2, 2a. As indicated in FIGS. 7–9 the construction may be such that the members 7', 7a' are constructed in the form of sleeves which are each provided with a projection corresponding to the projections 7, 7a as shown in FIGS. 1–3 and covering a segment of a circle. It should be understood, of course, that other solutions are entirely feasible and are intended to be encompassed in the protection sought herein.

Coming now to FIG. 10 it will be seen that there is shown therein a single block provided with a passage 5 in which a connecting member 11 is received, this member 11 having ridges 11b projecting from its periphery to prevent its undesired withdrawal from the passage 5. The outermost end of the connecting member 11 is provided with a flattened plate like portion 11a projecting beyond the end face of the block and the surface of this flattened portion 11a will be roughened so that it provides good adhesion for a connecting head 12 which may be suitably secured thereto, for instance by molding, and which in its configuration conforms to the heads 3, 3a shown in FIGS. 1 and 3. With this embodiment it is possible to rotate the connecting head 12 about the axis of the connecting member 11 and to thereby position it in any desired relationship relative to the block. To assure better positioning and seating of the connecting head 12 in the block 2, the head 12 is provided with an annular flange 12b which is received in a corresponding recess in the end face of the block 2 and whose upper surface is level with this face.

Figure 10B:
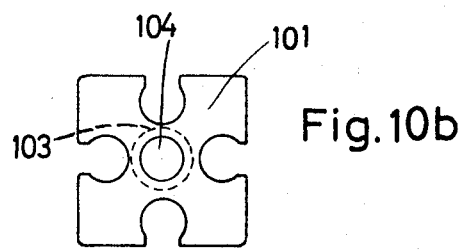

To provide a greater biasing force of one of the building blocks against the other when the same are connected to one another, or in other words, to enable a more rigid connection in such cases in which rotation is not desired or even after rotation is completed, it is advantageous to provide the inner surface of the material surrounding the respective passages with internal threads, and to provide the connecting members with external threads engageable with the internal threads. This is shown in FIGS. 10a and 10b and it will be evident from FIG. 10a that the building blocks 101 and 102 are joined in such a manner that their juxtaposed faces abut. The building block 102 is shown in phantom lines only, since it may be similar to block 101. The connecting member 103 is provided with a connecting head 104 corresponding to the connecting heads 3, 3a in FIGS. 1 and 3, and this connecting head 104 is shown to be received in a groove 105 provided in the building block 102, this groove 105 in turn corresponding to the grooves 4, 4a shown in FIGS. 4 and 6.

The remainder of the elongated connecting element 103, that is the part which is received in block 101, is externally screw threaded as indicated with reference numeral 106 and the passage provided in the block 101 is internally screw threaded, as indicated with reference numeral 107. To assure a proper and reliable engagement and maintainance of the blocks 101 and 102 with respect to one another, the thread 106 is of relatively low pitch and the individual turns of thread 106 tightly engage the thread 107 in the building block 101, FIG. 10b is a top-plan view of the building block 101.

As has already been mentioned and described in detail, the blocks are advantageously provided with connecting heads 3, 3a and corresponding grooves 4, 4a. Variations in the manufacturing tolerances of such blocks, which after all are primarily intended for use in toy assembly kits and are not precision elements, sometimes make it difficult to obtain tight frictional engagement of the heads 3, 3a in the grooves 4, 4a, and thus make for rather "wobbly" connections. Such difficulties are encountered particularly if a non-yielding material is used for the construction of blocks and heads, rather than a resiliently yielding material such as polyamide which provides an inherent biasing action.

To overcome such difficulties it is possible to provide the heads in such a manner that their dimension is variable between a minimum and a maximum value, resilient means being provided in conjunction with the heads which, in unstressed condition, enables the heads to assume one of the values and in stressed condition enables the heads to assume the other of the values.

Specific embodiments are clearly shown in the drawing, FIG. 11, firstly, shows a building block 11 which is provided with inwardly diverging longitudinally extending grooves 112 in one or more of its faces. On at least one face there is provided a connecting head 113 provided with an inwardly extending shaft which carries at its end a transversely extending flange or plate 113a. This shaft is received in a passage or channel in the block 111, and inserted into this passage or channel so as to be located inwardly adjacent to the end face 111a of the block 111 is a ring 115 which is secured to the block 111 and whose inner diameter is smaller than the diameter of the terminal turn of a coil spring 114 whose one end engages the inside of the ring 115 and whose other end engages the flange 113a of connecting head 113, whereby the coil spring pulls the head closer to the end face 111a of the block 111. It will be obvious that if the head 113 is received in a groove 112 of another building block, the biasing action of the spring 114 in the direction of the arrow A shown in FIG. 11 will securely maintain the thus-united blocks in their connected positions.

FIG. 12 is a top-plan view of the embodiment shown in FIG. 11 as seen in the direction of the arrow A and requires no additional explanation, it being understood that the reference numerals are identical with those in FIG. 11 but are prefixed with the number "12" in every case.

Coming now to FIG. 13, it will be seen that this embodiment is the same in concept as the one shown in FIG. 11. The difference here is simply the substitution of a plate- or disk-type spring 137 for the coil spring 114. The biasing action is the same as in the embodiment of FIG. 11, and the reference numerals are prefixed with the number "13."

The embodiment shown in FIGS. 14 and 15, finally, differs somewhat from the embodiments shown in FIGS. 11-13 in that it utilizes a different resilient element. The connecting head 153 is integral with the block 151 or is otherwise suitably secured thereto but without the possibility of relative movement. The resilient element is constituted by an insert 148 or 158 of elastic material which is received in the connecting head 143, 153 and projects therefrom in axial direction of the block, that is transversely to the axis of the respective connecting head.

It will be obvious from consideration of FIGS. 14 and 15 that, when the heads 143, 153 are received in complementary grooves 142 or 152, the inserts 148, 158 will be compressed by contact with the walls of the grooves whereby again a biasing action is created, so that the respective heads 143, 153 are reliably maintained in the corresponding grooves 142, 152.

It will be understood that each of the elements described above, or two or more together, may also find a useful application in other types of assembly kits differing from the types described above.

While the invention has been illustrated and described as embodied in an assembly kit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In an assembly kit, the combination of two similar building blocks each having a side face provided with an inwardly extending open-ended passage; an elongated connecting member having end portions frictionally receivable in said passages to couple said blocks together with said side face thereof substantially superimposed and parallel to each other and to define an axis about which said blocks may be turnably displaced with reference to each other, said axis being normal to said substantially superimposed parallel side faces of said blocks; and means on said blocks arranged in the region of said open-ended passages for limiting the relative turning displacement of said blocks with reference to each other.

2. A combination as defined in claim 1, wherein said connecting member is of substantially cylindrical cross-section.

3. A combination as defined in claim 2, wherein said connecting member is turnably displaceable with reference to said blocks.

4. A combination as defined in claim 2, wherein said end portions of said connecting member are provided with radial projections for frictionally engaging the material surrounding the respective passages.

5. A combination as defined in claim 2, wherein said passages are of cylindrical cross-section and are arranged centrally of the respective blocks.

6. A combination as defined in claim 4, wherein said projections are circumferentially extending frusto-conical portions surrounding the respective end portion and respectively diverging in direction from one toward the opposite end portion.

7. A combination as defined in claim 2, wherein one axial end of said connecting member carries a connecting head adapted to be received in complementary recesses provided in exposed surfaces of said blocks.

8. A combination as defined in claim 2, wherein one axial end of said connecting member carries a cylindrical connecting head having an axis extending normal to the axis of said connecting member and a neck of lesser diameter than said connecting head interposed between the same and said one axial end; and wherein exposed surfaces of said blocks are provided open to the respective surfaces and having thereat a cross-section corresponding to that of said neck, said grooves diverging inwardly to a cross-section at least equal to the cross-section of said connecting head so that the latter is receivable therewithin.

9. A combination as defined in claim 8, wherein said head and neck are integral with one another and with said elongated connecting member.

10. A combination as defined in claim 8, wherein at least said head is made of a synthetic plastic material.

11. A combination as defined in claim 1, wherein said means comprises a pair of ring-segments respectively carried by said surfaces and surrounding a portion of the respective open end of a passage, said segments engaging with one another in the connected condition of said blocks.

12. A combination as defined in claim 1, wherein said means comprises a pair of sleeves respectively received in said passages and the wall of each being provided at that one of its ends which is located adjacent the open end of said passage with an axial recess extending over part of its circumference so that a portion of each sleeve corresponding to the non-recessed wall portion constitutes an axial projection which is adapted to interengage with the corresponding recess on the other sleeve in the connected condition of said blocks.

13. A combination as defined in claim 1, wherein said means comprises cooperating external and internal screw threads provided on at least one end portion of said connecting member and in at least one of said passages and is operative for limiting rotational displacement of said blocks relative to each other in one direction when said one end portion is fully threaded into said one passage.

14. A combination as defined in claim 13, wherein the thread on said connecting member is of low pitch.

15. A building block as defined in claim 1, wherein one of said end portions is a cylindrical coupling head having an axis extending parallel to said surface and a neck portion of lesser diameter connecting said head with said block, one of said passages being a groove diverging in cross-section inwardly of the respective surface and said neck and head being receivable therein so that, when said head is received in the narrow portion of said groove, said head is received in the wider portion of the groove and separation of the blocks is thereby prevented.

16. A building block as defined in claim 1, wherein the other of said passages is a bore and said neck is provided with a stem of reduced cross-section and received in said bore, said stem having at its end received in the bore a radial flange, reducing means reducing the cross-section of said bore at said surface of the associated block, and spring means bearing on said reducing means and said flange and thereby biasing said head in direction toward said surface of the associated block.

17. A block as defined in claim 16, wherein said spring means is a coil spring.

18. A block as defined in claim 16, wherein said spring means is a disk-spring.

19. A block as defined in claim 15, further comprising a resiliently compressible insert received in said head and having a portion extending outwardly beyond a circumferential surface of said head.

References Cited

UNITED STATES PATENTS

| 1,985,992 | 9/1902 | Hayman | 46—26 |
| 2,225,612 | 12/1940 | Allen | 46—26 X |
| 2,800,743 | 7/1957 | Meehan et al. | 46—25 |
| 3,355,837 | 12/1967 | Pederson | 46—26 |

FOREIGN PATENTS 498,484  9/1954  Italy.

ANTONIO F. GUIDA, Primary Examiner

R. F. CUTTING, Assistant Examiner

U.S. Cl. X.R.

46—26